Figure 5:
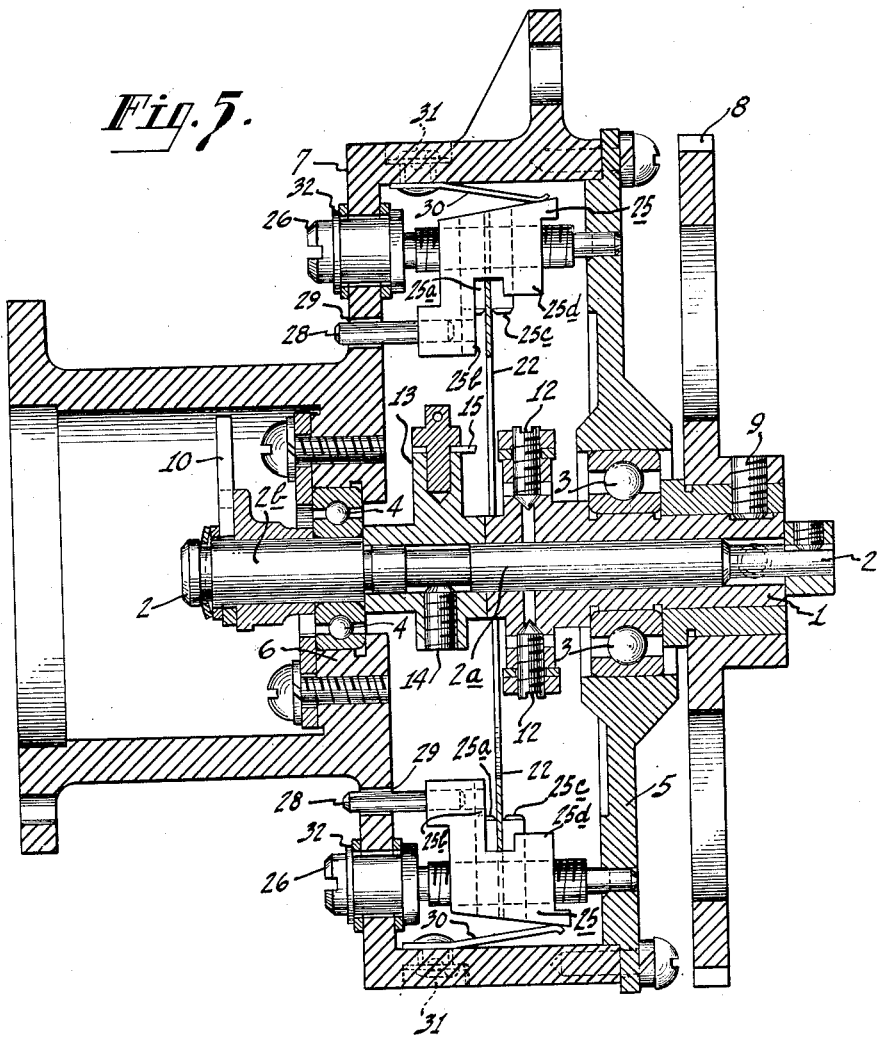

March 25, 1952 — H. A. BRELSFORD — 2,590,287
SHAFT COUPLING
Filed March 26, 1948 — 2 SHEETS—SHEET 1
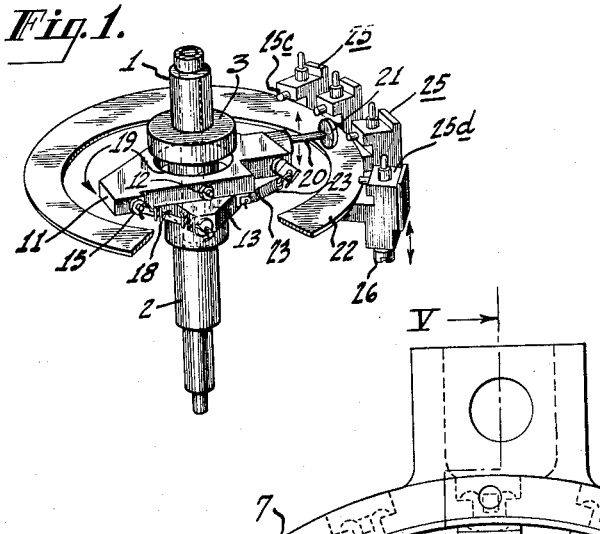
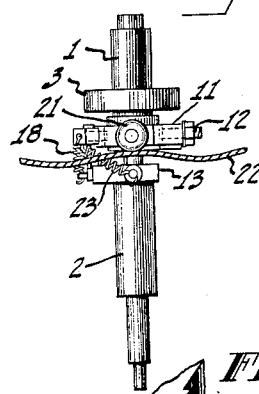
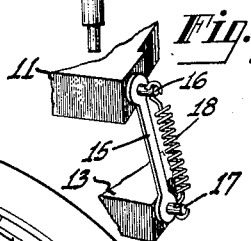
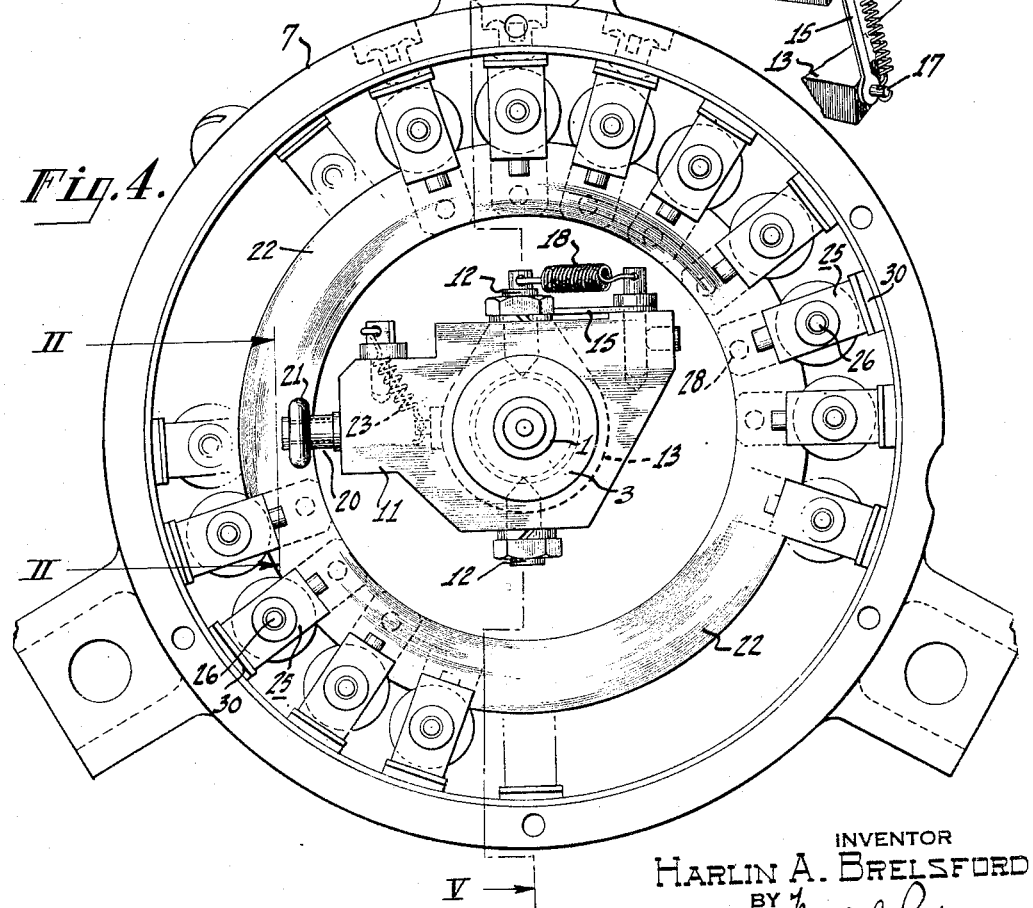
INVENTOR
HARLIN A. BRELSFORD
BY
ATTORNEY March 25, 1952  H. A. BRELSFORD  2,590,287
SHAFT COUPLING Filed March 26, 1948  2 SHEETS—SHEET 2

INVENTOR
HARLIN A. BRELSFORD
BY
ATTORNEY

Patented Mar. 25, 1952

2,590,287

UNITED STATES PATENT OFFICE 2,590,287

SHAFT COUPLING

Harlin A. Brelsford, Haddon Heights, N. J., assignor to Radio Corporation of America, a corporation of Delaware Application March 26, 1948, Serial No. 17,270

2 Claims. (Cl. 74—63)

1

This invention relates to mechanically coupled shafts and has for its principal object to provide a coupling means capable of continuously varying the mechanical phase relationship between a driving shaft and a driven shaft.

The invention will be described in connection with the accompanying drawings, wherein:

Fig. 1 is a partly broken-away view in perspective, with the housing removed, of a cam actuated shaft-coupling constructed in accordance with the principle of the present invention to provide a continuously variable mechanical phase relationship between the driving shaft and the driven shaft, Fig. 2 is an elevational view taken along the line II—II of Fig. 4, Fig. 3 is an enlarged fragmentary view of the link between the driving and driven coupling elements of the device of Figs. 1, 2 and 4, Fig. 4 is an enlarged plan view, with the cover plate and driving gear removed, of a housing containing the unit of Figs. 1 and 2 and Fig. 5 is a sectional view, with the cover plate and driving gear in place, taken on the line V—V of Fig. 4.

In the drawings, wherein like reference characters designate the same or corresponding parts in all figures, I designates a hollow outer shaft, hereinafter referred to as the "driving" shaft, and 2 designates a longer "driven" shaft which is supported throughout a portion (2a) of its length for rotation within the bore of the outer, driving shaft. As shown more clearly in the sectional view (Fig. 5) there is a bearing 3 on the outer surface of the driving shaft I and another bearing 4 on the outer surface of the exposed portion (2b) of the driven shaft 2. These bearings 3 and 4 are journaled for rotation in the end plates 5 and 6, respectively, of a cylindrical metal housing 7.

Referring still to Fig. 5, the driving shaft I projects beyond the outer surface of the rear cover plate 5 and is provided with a driving gear 8 which is secured thereon by a set-screw 9. The driving force applied to the gear 8 may be either of constant or variable speed. In one practical application of the invention wherein the unit herein described formed part of a "Shoran" aerial navigational system, the speed of rotation of the gear 8, and hence of the shafts I and 2 was a function of the speed of the aircraft and varied from 0 to about 20 R. P. M. In the said embodiment of the invention the hereinafter described variations in the mechanical phase relationship between the driving shaft I and the driven shaft 2 served to compensate for certain unavoidable electro-mechanical inaccuracies in

2 the windings etc. of an autosyn whose armature (not shown) was attached by means of a coupling pin 10 to the driven shaft 2.

As shown in the drawings, there is a rocker arm 11 pivotally secured by pivot screws 12 to the inner end of the driving shaft 1, and a rigid arm 13 which is fixed on the adjacent exposed portion 2b of the driven shaft 2 by a set screw 14. The rocker arm 11 on the driving shaft 1 and the fixed arm 13 on the driven shaft 2 are mechanically coupled together, on the same side of the common axis of the said shafts, by a short arm 15 which is pivotally connected at its opposite ends to the said shafts by pins 16 and 17, respectively. This short arm or link 15 is not rigid but, as shown in Fig. 3, is cut away intermediate its ends to render it at least slightly flexible when it is subjected to torsion during normal operation of the device. As also shown in Fig. 3, the link 15 has a relatively loose fit on the supporting pins and, in any event, is subjected to wear about its pivot points. Accordingly, a light coil spring 18 is stretched between the coupling pins 16 and 17 to minimize backlash incident to wear about the pivot points, without substantially affecting the position or angle of tilt of the rocker arm 11.

As clearly shown in Figs. 1 and 4 the rocker arm 11 is in the form of an irregularly shaped metal plate having a central aperture 19 of a diameter sufficiently large to permit the said arm or plate to be tilted or rocked without being brought into contact with the surface of the driving shaft 1. As previously pointed out, it is adjacent to one radially extending portion of the rocker arm 11 that the link 15 and spring 18 are connected. The oppositely-extending portion of the rocker arm 11 is provided on its outer end with a radially extending arm 20 upon which a cam follower in the form of a small wheel 21 is mounted. This wheel 21 rides on a stationary circular track comprising the "upper" surface of a flexible metal annulus 22 and is biased to follow any undulations in the said surface by means of a relatively stiff coil spring 23 which is connected between the rigid arm 13 (upon the driven shaft 2) and the wheel supporting end of the rocker arm 11.

In the absence of any undulations in the flexible track or cam 22, the cam follower 21 and hence the rocker arm 11 remain untilted (i. e. in a plane normal to the common axis of the driving and driven shafts 1 and 2). Hence, any torque applied to the driving shaft 1 through the gear 8 will be transmitted in phase, to the driven shaft 2 through the untilted rocker arm 11 and link 15 just as though the said shafts were rigidly coupled together. However, should the cam follower 21 encounter an undulation in the surface of the track or cam 22 the rocker arm 11 will tilt and this tilting movement will be translated by the link 15 into a rotary component which lags or leads that of the driving shaft 1. This added rotary component is applied to the driven shaft 2 through its arm 13 in a direction determined by the direction in which the rocker arm 11 is tilted. Thus, should the cam follower 21 encounter the crest of an undulation in the cam 22 the link 15 will be pressed down (as viewed in Figs. 1 and 3) and urge the driven shaft 2 in the counter-clockwise direction (as viewed from the driving end of the shaft 1) so that, if the driving shaft is moving clockwise (as viewed from the driving end), the driven shaft 2 will, in terms of its phase, "lag" by an angle $\theta$ determined by the height of the said undulation. On the other hand, when the cam follower 21 encounters the trough of an undulation in the cam 22 the direction of tilt of the rocker arm 11 is such as to lift the link 15; hence the driven shaft 2 will "lead" the driving shaft 1.

From the foregoing it will be apparent that any desired instantaneous phase relationship may be established between the driving shaft 1 and the driven shaft 2 by endowing the flexible cam surface 22 with an undulate contour throughout that portion of its circumference which corresponds to the angle of shaft rotation whereat it is desired to establish the difference in phase between the said shafts. Such undulations may be formed in the flexible cam surface 22, in accordance with the invention, by means of the clamping mechanisms shown in Figs. 1, 4 and 5.

The mechanism for altering the contour of the flexible cam surface 22 comprises a multiplicity (say, twenty) of duplicate clamping devices 25, which are mounted, upon individual adjusting screws 26, in circumferentially spaced array about the outer periphery of the said cam surface. The lower jaw of each clamp engages the lower surface of the cam 22 and is here shown as comprising a small block or pin 25a on the surface of the base 25b through which the adjusting screw 26 extends. The upper jaw comprises a removable inwardly directed pin or screw 25c seated in a pedestal 25d on the outer extremity of the base 25b in a position contiguous the upper surface of the cam. The adjusting screw 26 for each of the clamps 25 extends to the exterior of the housing 7 (see Fig. 5) so that the said screws are accessible for adjustment. A pin 28, dependent from each clamp base, extends through a guide hole 29 in the casing and prevents the clamp from turning when its adjusting screw 26 is turned. A series of leaf-springs 30, one for each of the clamps 25, secured by rivets 31 to the inner cylindrical surface of the housing 7, serve to damp any vibratory movement of the clamps occasioned by shocks and tremors of external origin. A lock washer in the form of a bowed snap-ring 32, under the head of each adjusting screw 26, also aids in the suppression of such vibrations.

If it is now assumed that the technician in charge of the instrument (to which this coupling device is applied) desires to alter the mechanical phase relationship between the driving and driven shafts at some particular arcuate portion of the 360° path of rotation of the said shafts, he needs merely to adjust the screw (or screws) 26 of the clamping device (or devices) which are allotted to that particular arcuate portion of the said path.

The direction and degree to which the said adjusting screws 26 are turned will of course depend upon the direction and amount of the change of phase that is desired. Thus, if the driven shaft 2 is to "lag" behind the driving shaft 1 during a portion of its 360° clockwise cycle of rotation the adjusting screw 26 for that particular portion of the surface of the cam should be turned in the counterclockwise direction (as viewed from its head) in order to advance the clamp 25. This bends the flexible cam surface 22 "upwardly" (as viewed in Fig. 1) and thus produces a crest of the desired altitude in the said surface. If the driven shaft 2 is to "lead" the driving shaft during another portion of its 360° cycle of rotation the appropriate adjusting screw or screws 26 are of course turned in the opposite (clockwise) direction to produce a trough or depression in the flexible cam surface 22. When the cam surface 22 has been provided with the desired number and arrangement of crests and troughs, and the power is turned on, the circular undulate movement of the cam follower thereover is transmitted through the rocker arm to the tilted link 15 which converts the simple rotary movement of the driving shaft 1 into a non-synchronous "lagging" or "leading" rotary movement of the driven shaft 2.

It will now be apparent that the present invention provides a coupling means capable of continuously varying the mechanical phase relationship between a driving shaft and a driven shaft, and one which lends itself readily to the establishment of a desired phase relationship throughout the entire 360° movement of said shafts.

What is claimed is:

1. In combination, a driving shaft and a driven shaft mounted for non-synchronous rotation about a common axis, a rocker arm mounted for tiltable movement upon and for rotation with said driving shaft, a radially extending cam follower on said rocker arm, a stationary undulate cam surface surrounding said axis and upon which said cam follower is adapted to travel with an undulate movement upon rotation of said driving shaft, and coupling means connected between said rocker arm and said driven shaft for translating said undulate movement into non-synchronous rotary movement of said driven shaft with respect to said driving shaft, said coupling means comprising an arm inclined at an angle with respect to said axis and pivotally connected at its opposite ends to said rocker arm and said driven shaft, respectively.

2. The invention as set forth in claim 1 and wherein a coil spring connected between the points to which said coupling arm is pivotally connected serves to minimize back lash between said rocker arm and driven shaft.

HARLIN A. BRELSFORD.

REFERENCES CITED

The following references are of record in the file of this patent:

UNITED STATES PATENTS

| Number | Name | Date |
|---|---|---|
| 1,480,684 | Hudson | Jan. 15, 1924 |
| 1,571,175 | Bazzoni | Jan. 26, 1926 |
| 2,079,197 | Bergman | May 4, 1937 |
| 2,180,766 | Pearson | Nov. 21, 1939 |
| 2,398,100 | Lear | Apr. 9, 1946 |
| 2,409,130 | Lear | Oct. 8, 1946 |